United States Patent
Yu et al.

(10) Patent No.: US 11,051,352 B2
(45) Date of Patent: Jun. 29, 2021

(54) SECONDARY CELL GROUP FAILURE HANDLING

(71) Applicant: QUALCOMM Incorporated, San Diego, CA (US)

(72) Inventors: Yu-Ting Yu, San Francisco, CA (US); Keiichi Kubota, Tokyo (JP); Gavin Bernard Horn, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/812,021

(22) Filed: Mar. 6, 2020

(65) Prior Publication Data

US 2020/0214069 A1 Jul. 2, 2020

Related U.S. Application Data

(63) Continuation of application No. 16/274,166, filed on Feb. 12, 2019, now Pat. No. 10,616,945.

(Continued)

(51) Int. Cl.
*H04W 4/00* (2018.01)
*H04W 76/18* (2018.01)
(Continued)

(52) U.S. Cl.
CPC ............ *H04W 76/18* (2018.02); *H04B 7/022* (2013.01); *H04L 1/08* (2013.01); *H04L 1/1607* (2013.01);
(Continued)

(58) Field of Classification Search
CPC ..... H04W 76/18; H04W 24/04; H04W 76/15; H04L 1/1607; H04L 1/08
(Continued)

(56) References Cited

U.S. PATENT DOCUMENTS

| 2017/0111832 A1* | 4/2017 | Wen .................. H04W 76/16 |
| 2019/0254100 A1 | 8/2019 | Yu et al. |

OTHER PUBLICATIONS

Ericsson: "CR on SCG Failure Handling for EN-DC in 36.331", 3GPP Draft; R2-1801229—CR on SCG Failure Handling for EN-DC in 36.331, 3rd Generation Partnership Project (3GPP), Mobile Competence Centre ; 650, Route Des Lucioles ; F-06921 Sophia-Antipolis Cedex , vol. RAN WG2, No. Vancouver, Canada; Jan. 22, 2018-Jan. 26, 2018, Jan. 12, 2018 (Jan. 12, 2018), XP051386659, 3 Pages, Retrieved from the Internet:URL:http://www.3gpp.org/ftp/tsg%5Fran/WG2%5FRL2/TSGR2%5FAHs/2018%5F01%5FNR/Docs/ [retrieved on Jan. 12, 2018].

(Continued)

*Primary Examiner* — Marcos Batista
(74) *Attorney, Agent, or Firm* — Qualcomm Incorporated

(57) ABSTRACT

Methods, systems, and devices for wireless communications are described. A user equipment (UE) may be configured to operate in dual connectivity (DC) and with split radio bearers, such that one or more split radio bearers are associated with a first cell group and one or more split radio bearers are associated with a second cell group. In some cases, a cell group failure may occur. Accordingly, the UE may autonomously update one or more radio bearer configurations of the split radio bearers to determine a processing scheme for the cell group failure. Additionally or alternatively, as a result of the cell group failure, an amount of unacknowledged data in a radio link control (RLC) buffer for the second cell group may get stuck such that the network cannot access it. Accordingly, the UE may perform a PDCP data recovery (e.g., user plane handling) to access the unacknowledged data.

18 Claims, 14 Drawing Sheets

Related U.S. Application Data

(60) Provisional application No. 62/631,172, filed on Feb. 15, 2018.

(51) Int. Cl.

| | | |
|---|---|---|
| *H04W 76/15* | (2018.01) | |
| *H04L 1/08* | (2006.01) | |
| *H04L 1/16* | (2006.01) | |
| *H04W 24/04* | (2009.01) | |
| *H04B 7/022* | (2017.01) | |
| *H04W 76/19* | (2018.01) | |

(52) U.S. Cl.
CPC ........... *H04W 24/04* (2013.01); *H04W 76/15* (2018.02); *H04W 76/19* (2018.02)

(58) Field of Classification Search
USPC ........................................ 455/435.1; 370/338
See application file for complete search history.

(56) References Cited

OTHER PUBLICATIONS

Ericsson: "Duplication in UL in Dual Connectivity", 3GPP Draft; R2-1702750—Duplication in UL in Dual Connectivity, 3rd Generation Partnership Project (3GPP), Mobile Competence Centre ; 650, Route Des Lucioles ; F-06921 Sophia-Antipolis Cedex; France, vol. RAN WG2, No. Spokane, USA; Apr. 3, 2017-Apr. 7, 2017, Apr. 3, 2017 (Apr. 3, 2017),XP051244738, 2 Pages, Retrieved from the Internet: URL:http://www.3gpp.org/ftp/Meetings_3GPP_SYNC/RAN2/Docs/ [retrieved on Apr. 3, 2017], Paragraph [02.2].

Huawei et al., "UL Data Transmission upon SCG-RLF for UL Split Bearer", 3GPP Draft; R2-153318, 3rd GenerationPartnership Project (3GPP), Mobile CompetenceCentre ; 650, Route Des Lucioles; F-06921 Sophia-Antipolis Cedex ; France , vol. RAN WG2, No. Beijing, China;Aug. 24, 2015-Aug. 28, 2015, Aug. 23, 2015 (Aug. 23, 2015), XP051004064, 3 Pages,Retrieved from the Internet: URL:http://www.3gpp.org/ftp/Meetings_3GPP_SYNC/RAN2/Docs/ [retrieved on Aug. 23, 2015].

International Search Report and Written Opinion—PCT/US2019/017769—ISA/EPO—dated May 16, 2019.

Kyocera: "PDCP PDU Delivery for Uplink Split Bearer", 3GPP Draft; R2-152640_UL-Split-Bearer, 3rd Generation Partnership Project (3GPP), Mobile Competence Centre ; 650, Route Des Lucioles; F-06921 Sophia-Antipolis Cedex; France, vol. RAN WG2, No. Fukuoka, Japan;May 25, 2015-May 29, 2015, May 24, 2015 (May 24, 2015), XP050972476, 3 Pages,Retrieved from the Internet: URL:http://www.3gpp.org/ftp/Meetings_3GPP_SYNC/RAN2/Docs/ [retrieved on May 24, 2015], Paragraph [02.2].

LG Electronics Inc: "PDCP Data Volume Indication to MAC",3GPP Draft; R2-1713663 PDCP Data Volume Indication to MAC, 3rd Generation Partnership Project (3GPP),Mobile Competence Centre; 650, Route Des Lucioles ;F-06921 Sophia-Antipolis Cedex; France, vol. RAN WG2,No. Reno, USA; Nov. 27, 2017-Dec. 1, 2017, Nov. 17, 2017(Nov. 17, 2017), XP051372330, 6 Pages, Retrieved from the Internet: URL:http://www.3gpp.org/ftp/tsg%5Fran/WG2%5FRL2/TSGR2%5F100/Docs/ [retrieved on Nov. 17, 2017], Issue 3 and Proposal 4.

Qualcomm Incorporated: "UL Path Switch Upon SCG Failure",3GPP Draft; R2-1713640 UL Path Switch Upon SCG Failure, 3rd Generation Partnership Project (3GPP),Mobile Competence Centre ; 650, Route Des Lucioles ;F-06921 Sophia-Antipolis Cedex ; France, vol. RAN WG2,No. Reno, USA; Nov. 27, 2017-Dec. 1, 2017, Nov. 17, 2017(Nov. 17, 2017), XP051372307, 1 Page, Retrieved from the Internet: URL:http://www.3gpp.org/ftp/tsg%5Fran/WG2%5FRL2/TSGR2%5F100/Docs/ [retrieved on Nov. 17, 2017].

\* cited by examiner

SECONDARY CELL GROUP FAILURE HANDLING

CROSS REFERENCES

The present Application for Patent is a Continuation of U.S. patent application Ser. No. 16/274,166 by Yu et al., entitled "Secondary Cell Group Failure Handling," filed Feb. 12, 2019, which claims the benefit of U.S. Provisional Patent Application No. 62/631,172 by Yu et al., entitled "Secondary Cell Group Failure Handling," filed Feb. 15, 2018, both of which are assigned to the assignee hereof and expressly incorporated by reference herein in their entirety.

BACKGROUND

The following relates generally to wireless communication, and more specifically to secondary cell group (SCG) failure handling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, a UE may be configured for dual connectivity (DC), where the UE can communicate with a master cell group (MCG) and an SCG simultaneously. Additionally, the UE may be further configured with one or more split bearers in order to communicate with the MCG and the SCG. For example, a transmission may be sent over the split radio bearers from both cell groups, where the transmission and split radio bearers may be associated with signaling or data. In some cases, the transmission may be duplicated for each of the split radio bearers to enhance reliability. Alternatively, the transmission may be sent over whichever split radio bearer is determined to have a better radio path for the UE. However, in some cases, a radio link failure (RLF) may occur with the SCG, and the UE may wait for the network to reconfigure the one or more split radio bearers, which may increase latency for transmissions initially scheduled with the SCG. Improved techniques are desired for handling an SCG failure.

SUMMARY

The described techniques relate to improved methods, systems, devices, or apparatuses that support secondary cell group (SCG) failure handling. Generally, the described techniques provide for a user equipment (UE) to identify one or more split bearers for dual connectivity (DC) operation with a master cell group (MCG) and an SCG. In some cases, the UE may identify that an SCG failure occurs in communications with the SCG. Accordingly, the UE may update one or more radio bearer configurations of the one or more split radio bearers without waiting for a network reconfiguration of the one or more split radio bearers. In some cases, the UE may update the one or more radio bearer configurations by changing a primary path to be via the MCG. The UE may further update an uplink data split threshold parameter such that buffered data is transmitted via the MCG instead of via the SCG. Additionally or alternatively, the UE may update the one or more radio bearer configurations by deactivating packet data convergence protocol (PDCP) duplication for the one or more split radio bearers.

In some cases, after identifying the SCG failure, the UE may identify that unacknowledged data is in a radio link control (RLC) buffer for communications via the SCG and handle the unacknowledged data without waiting for network reconfiguration of the one or more split radio bearers. Accordingly, the UE may perform PDCP data recovery for the unacknowledged data in the RLC buffer. Alternatively, the UE may discard the unacknowledged data in the RLC buffer. In some cases, the UE may be configured to automatically discard the unacknowledged data in the RLC buffer when the SCG failure is identified.

A method of wireless communication is described. The method may include identifying that the UE is configured with one or more split radio bearers under DC operation with an MCG and an SCG, identifying, at the UE, an SCG failure in communications with the SCG, and updating, autonomously at the UE, one or more radio bearer configurations of the one or more split radio bearers based on the SCG failure and without waiting for network reconfiguration of the one or more split radio bearers.

An apparatus for wireless communication is described. The apparatus may include means for identifying that the UE is configured with one or more split radio bearers under DC operation with an MCG and an SCG, means for identifying, at the UE, an SCG failure in communications with the SCG, and means for updating, autonomously at the UE, one or more radio bearer configurations of the one or more split radio bearers based on the SCG failure and without waiting for network reconfiguration of the one or more split radio bearers.

Another apparatus for wireless communication is described. The apparatus may include a processor, memory in electronic communication with the processor, and instructions stored in the memory. The instructions may be operable to cause the processor to identify that the UE is configured with one or more split radio bearers under DC operation with an MCG and an SCG, identify, at the UE, an SCG failure in communications with the SCG, and update, autonomously at the UE, one or more radio bearer configurations of the one or more split radio bearers based on the SCG failure and without waiting for network reconfiguration of the one or more split radio bearers.

A non-transitory computer-readable medium for wireless communication is described. The non-transitory computer-readable medium may include instructions operable to cause a processor to identify that the UE is configured with one or more split radio bearers under DC operation with an MCG and an SCG, identify, at the UE, an SCG failure in communications with the SCG, and update, autonomously at the UE, one or more radio bearer configurations of the one or more split radio bearers based on the SCG failure and without waiting for network reconfiguration of the one or more split radio bearers.

In some examples of the method, apparatus, and non-transitory computer-readable medium described above, updating the one or more radio bearer configurations includes changing a primary path to be via the MCG.

Some examples of the method, apparatus, and non-transitory computer-readable medium described above may further include processes, features, means, or instructions for identifying that the primary path of the radio bearer configuration prior to the SCG failure was via the SCG, where changing the primary path to be via the MCG may be based on the identified SCG failure.

Some examples of the method, apparatus, and non-transitory computer-readable medium described above may further include processes, features, means, or instructions for updating an uplink data split threshold parameter such that buffered data may be transmitted via the MCG instead of via the SCG.

In some examples of the method, apparatus, and non-transitory computer-readable medium described above, updating the uplink data split threshold parameter includes setting the uplink data split threshold parameter to infinity.

In some examples of the method, apparatus, and non-transitory computer-readable medium described above, updating the uplink data split threshold parameter includes releasing the uplink data split threshold parameter.

In some examples of the method, apparatus, and non-transitory computer-readable medium described above, updating the one or more radio bearer configurations includes deactivating PDCP duplication for the one or more split radio bearers.

Some examples of the method, apparatus, and non-transitory computer-readable medium described above may further include processes, features, means, or instructions for identifying that, prior to the SCG failure, PDCP duplication was active for the one or more split radio bearers.

Some examples of the method, apparatus, and non-transitory computer-readable medium described above may further include processes, features, means, or instructions for reporting to the network that the one or more radio bearer configurations may have been updated.

In some examples of the method, apparatus, and non-transitory computer-readable medium described above, the one or more split radio bearers include signaling radio bearers (SRBs), data radio bearers (DRBs), or a combination of both.

In some examples of the method, apparatus, and non-transitory computer-readable medium described above, identifying the SCG failure includes identifying a radio link failure (RLF) in the communications with the SCG.

A method of wireless communication is described. The method may include identifying that the UE is configured with one or more split radio bearers under DC operation with an MCG and an SCG, identifying, at the UE, an SCG failure in communications with the SCG, identifying that unacknowledged data is in an RLC buffer for communications via the SCG, and determining a processing scheme for the unacknowledged data based on the SCG failure and without waiting for network reconfiguration of the one or more split radio bearers.

An apparatus for wireless communication is described. The apparatus may include means for identifying that the UE is configured with one or more split radio bearers under DC operation with an MCG and an SCG, means for identifying, at the UE, an SCG failure in communications with the SCG, means for identifying that unacknowledged data is in an RLC buffer for communications via the SCG, and means for determining a processing scheme for the unacknowledged data based on the SCG failure and without waiting for network reconfiguration of the one or more split radio bearers.

Another apparatus for wireless communication is described. The apparatus may include a processor, memory in electronic communication with the processor, and instructions stored in the memory. The instructions may be operable to cause the processor to identify that the UE is configured with one or more split radio bearers under DC operation with an MCG and an SCG, identify, at the UE, an SCG failure in communications with the SCG, identify that unacknowledged data is in an RLC buffer for communications via the SCG, and determine a processing scheme for the unacknowledged data based on the SCG failure and without waiting for network reconfiguration of the one or more split radio bearers.

A non-transitory computer-readable medium for wireless communication is described. The non-transitory computer-readable medium may include instructions operable to cause a processor to identify that the UE is configured with one or more split radio bearers under DC operation with an MCG and an SCG, identify, at the UE, an SCG failure in communications with the SCG, identify that unacknowledged data is in an RLC buffer for communications via the SCG, and determine a processing scheme for the unacknowledged data based on the SCG failure and without waiting for network reconfiguration of the one or more split radio bearers.

In some examples of the method, apparatus, and non-transitory computer-readable medium described above, the processing scheme includes performing PDCP data recovery at the UE for the unacknowledged data in the RLC buffer.

In some examples of the method, apparatus, and non-transitory computer-readable medium described above, the processing scheme includes discarding the unacknowledged data in the RLC buffer.

Some examples of the method, apparatus, and non-transitory computer-readable medium described above may further include processes, features, means, or instructions for identifying that the one or more split radio bearers may be configured as bearers capable of performing duplication.

Some examples of the method, apparatus, and non-transitory computer-readable medium described above may further include processes, features, means, or instructions for identifying that, prior to the SCG failure, PDCP duplication was active for the one or more split radio bearers, where the discarding of the unacknowledged data in the RLC buffer may be based on PDCP duplication being active for the one or more split radio bearers.

Some examples of the method, apparatus, and non-transitory computer-readable medium described above may further include processes, features, means, or instructions for identifying that the one or more split radio bearers may be configured with an indication to automatically discard the unacknowledged data in the RLC buffer based on the identified SCG failure.

In some examples of the method, apparatus, and non-transitory computer-readable medium described above, the processing scheme includes attempting RLC reestablishment with an RLC for the SCG.

Some examples of the method, apparatus, and non-transitory computer-readable medium described above may further include processes, features, means, or instructions for identifying that the one or more split radio bearers may be DRBs configured for RLC acknowledgement mode (AM).

In some examples of the method, apparatus, and non-transitory computer-readable medium described above, identifying the SCG failure includes identifying a radio link failure (RLF) in the communications with the SCG.

DETAILED DESCRIPTION

In some examples of a wireless communications systems, a user equipment (UE) may communicate with a first cell of a first base station and with a second cell of a second base station (e.g., through dual connectivity (DC) communications). In some cases, the cells of the first base station may include a first cell group (e.g., a master cell group (MCG)) and the cells of the second base station may include a second cell group (e.g., a secondary cell group (SCG)). Additionally, the first base station may operate on a first radio access technology (RAT) (e.g., long term evolution (LTE) or new radio (NR)), and the second base station may operate on the same RAT or on a second RAT different from the first RAT. After being configured with the DC operations, the UE may further be configured with one or more split radio bearers. The split radio bearers may enable the UE to transmit or receive a message through one or both of the MCG and SCG. For example, the message may be duplicated for each of the split radio bearers to enhance reliability (e.g., packet data convergence protocol (PDCP) duplication). Alternatively, the message may be transmitted or received over whichever split radio bearer is determined to have a better radio path for the UE.

In some cases, a radio link failure (RLF) may occur for communications between the SCG and the UE. Instead of waiting for the network to reconfigure the one or more split radio bearers, the UE may autonomously update one or more radio bearer configurations of the one or more split radio bearers. For example, the UE may change a primary path of the radio bearer configuration to be via the MCG. In some cases, the UE may further update an uplink data split threshold value such that data is transmitted via the MCG instead of the SCG. Additionally or alternatively, as a result of the SCG failure, an amount of unacknowledged data in a radio link control (RLC) buffer for the SCG may get stuck such that the network cannot access it. Accordingly, the UE may perform a PDCP data recovery (e.g., user plane handling) to access the unacknowledged data. Alternatively, the UE may discard the unacknowledged data in the RLC buffer. In some cases, as noted above, the one or more split radio bearers may include duplicated data. As such, a PDCP duplication may be active for the one or more split radio bearers. If an SCG failure occurs, the UE may deactivate the PDCP duplication.

Aspects of the disclosure are initially described in the context of a wireless communications system. Additional wireless communications systems and a process flow are then provided to further describe aspects of the disclosure. Aspects of the disclosure are further illustrated by and described with reference to apparatus diagrams, system diagrams, and flowcharts that relate to SCG failure handling.

Figure 1:
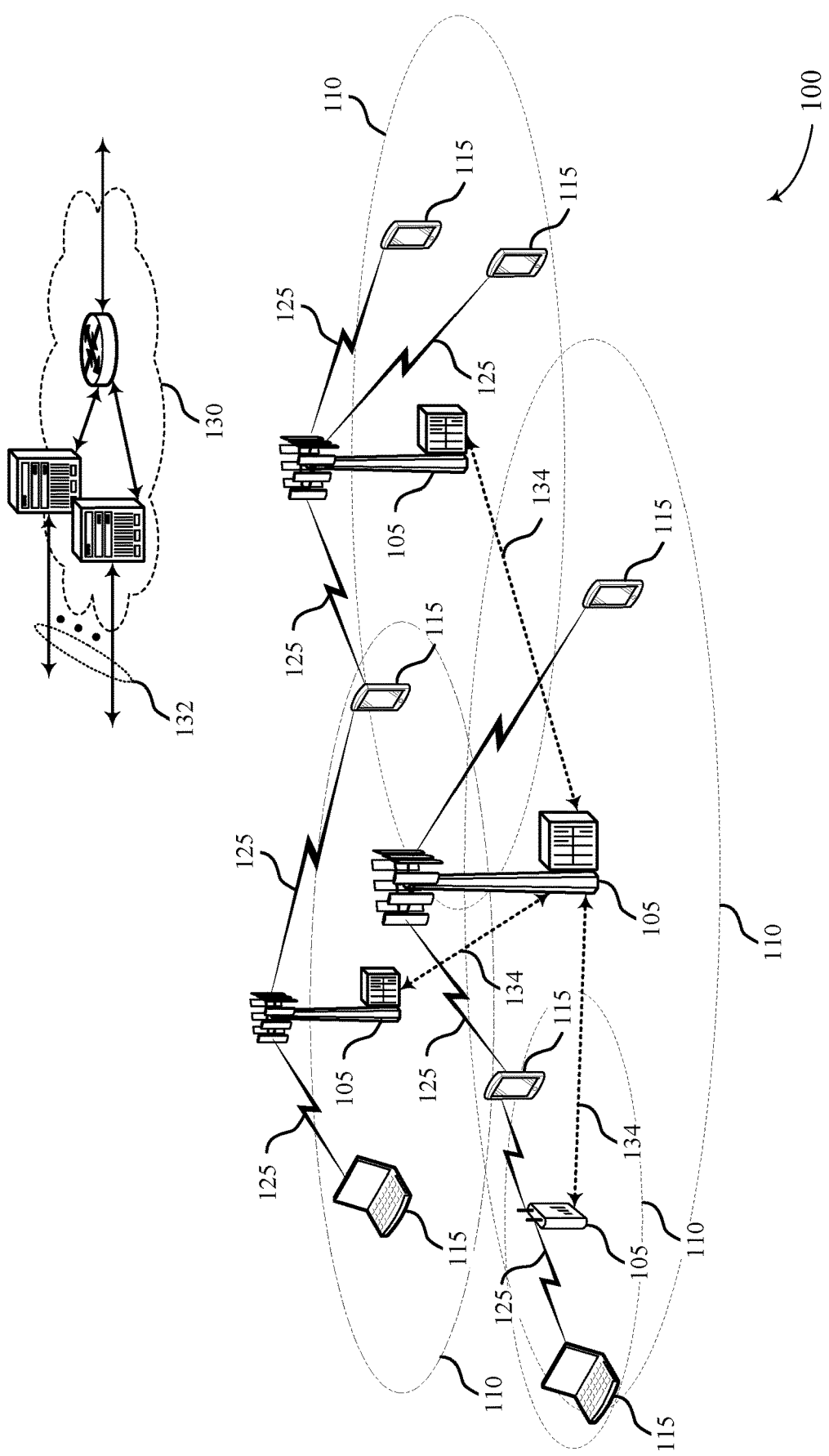
FIG. 1 illustrates an example of a system for wireless communication that supports secondary cell group (SCG) failure handling in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or PDCP layer may be IP-based. An RLC layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless communications system 100 may include a first base station 105 that may operate in a first RAT and a second base station 105 that may operate in a second RAT, where the second RAT may be different from the first RAT. Alternatively, both base stations 105 may operate in the same RAT. In either case, a UE 115 may communicate with cells of both base stations through DC operations, where the first base station 105 may include an MCG and the second base station 105 may be part of an SCG. After being configured with the DC operations, the UE 115 may further be configured with one or more split radio bearers. In some cases, the split radio bearers may be associated with signaling (e.g., signaling radio bearers (SRBs)) and/or data (e.g., data radio bearers (DRBs)).

The split radio bearers may enable the UE 115 to transmit or receive a message through one or both of the MCG and SCG. Each split radio bearer may include an RLC configured for uplink and/or downlink transmissions between the UE 115 and the MCG and SCG. One split radio bearer may be utilized as a primary path (e.g., with one of the MCG or SCG), and the other split radio bearer may be utilized as a secondary path (e.g., with the other of the MCG or SCG utilized for the primary path). In some cases, the message may be duplicated for each of the split radio bearers (e.g., on both the primary and secondary paths) to enhance reliability (e.g., through PDCP duplication). Alternatively, the message may be transmitted or received over whichever split radio bearer is determined to have a better radio path for the UE 115. In some cases, the split radio bearers may have an uplink data split threshold associated with their configuration (e.g., ul-PdcpDuplication). If a size of buffered uplink data exceeds the threshold, the UE 115 may transmit the uplink data via both the primary and secondary paths (e.g., to the MCG and the SCG). If the size of buffered uplink data does not exceed the threshold, the UE 115 may transmit the uplink data via the primary path only.

In some cases, a UE 115 may identify an SCG failure that prevents further communications between the UE 115 and the SCG. The SCG failure may include an RLF, where the RLF may include a maximum number of random access channel (RACH) attempts failure, a maximum number of RLC protocol data unit (PDU) retransmissions failure, a physical layer link problem, etc. In some cases, the UE 115 may have been configured to use the SCG as a primary path for a split bearer configuration. As such, when the SCG failure occurs, uplink transmissions from the UE 115 may be affected. Additionally or alternatively, when the SCG failure occurs, an amount of unacknowledged data may remain in an RLC buffer for the SCG, such that the network cannot receive the amount of unacknowledged data. In some cases, the UE 115 may wait for the network to reconfigure the split radio bearers before attempting further communications.

Wireless communications system 100 may support efficient techniques for handling issues that arise when an SCG failure occurs. In some cases, a UE 115 may configure a primary path to be via an MCG without waiting for the network to reconfigure the split radio bearers (e.g., a configuration change of the split radio bearers). The UE 115 may then release or configure a data split threshold to infinity to ensure all communications occur on the newly configured primary path with the MCG. Additionally or alternatively, the UE 115 may perform PDCP data recovery for unacknowledged data in an RLC buffer for the SCG without waiting for the network to reconfigure the split radio bearers (e.g., user plane handling). As such, the unacknowledged data may be retransmitted via the MCG immediately. In some cases, the UE 115 may discard the unacknowledged data in the RLC buffer. Additionally, in response to the SCG failure, the UE 115 may deactivate duplication for the split radio bearers (e.g., PDCP duplication) so that the UE 115 does not have to duplicate the data when one of the radio bearers is no longer in operation. In some cases, the UE 115 may attempt to reestablish communications with the SCG.

Figure 2:
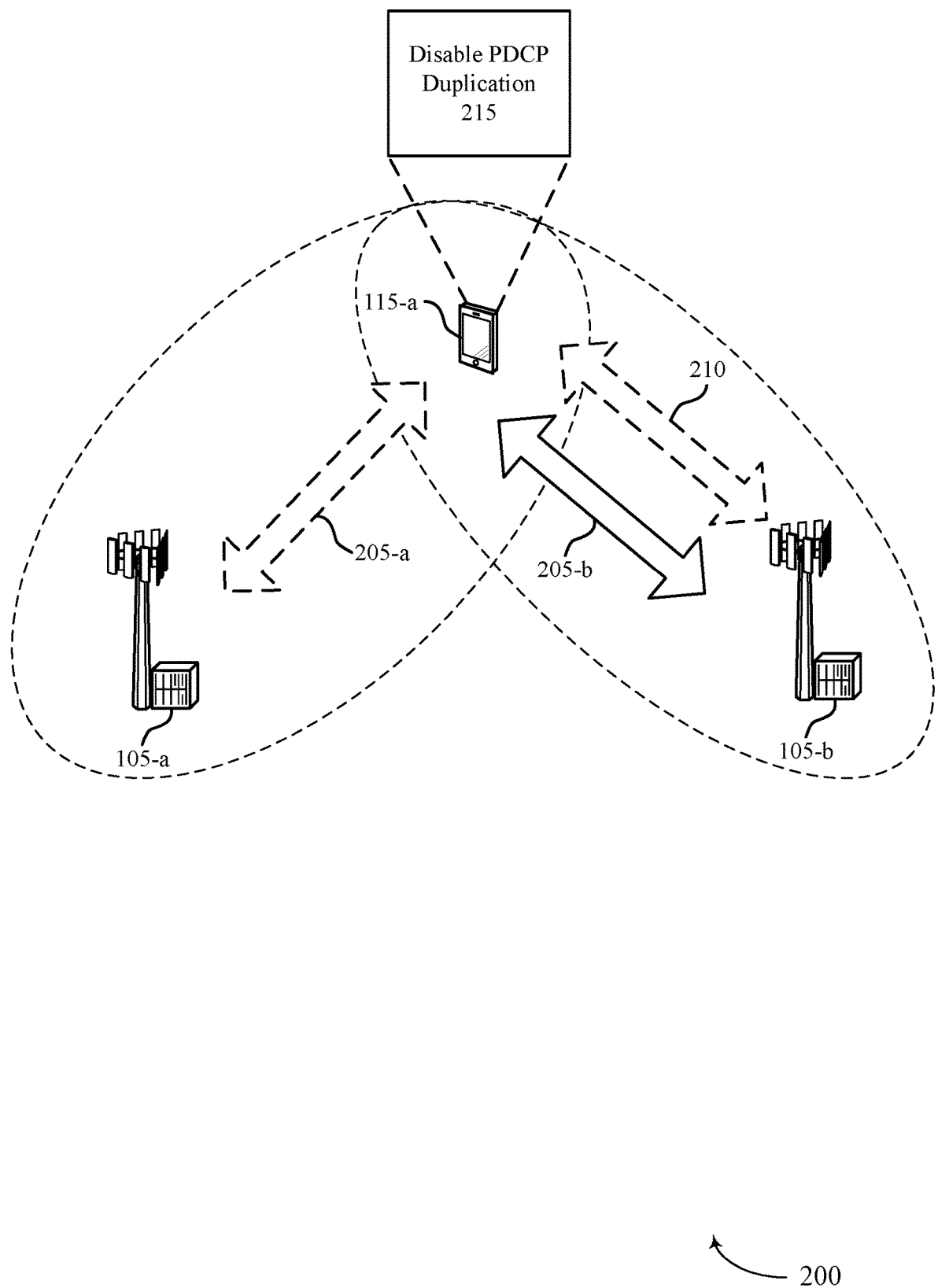
FIGS. 2 and 3 illustrate example of wireless communications systems that support SCG failure handling in accordance with aspects of the present disclosure.

FIG. 2 illustrates an example of a wireless communications system 200 that supports SCG failure handling in accordance with various aspects of the present disclosure. In some examples, wireless communications system 200 may implement aspects of wireless communications system 100. Wireless communications system 200 may include a base station 105-*a*, a base station 105-*b*, and a UE 115-*a*, which may be examples of base stations 105 and UEs 115 as described above with reference to FIG. 1. Base station 105-*a* may be associated with an SCG and may be referred to as SCG 105-*a*. Base station 105-*b* may be associated with an MCG and may be referred to as MCG 105-*b*. Accordingly, UE 115-*a* may be configured to operate in DC and with split radio bearers. In some cases, the split radio bearers may include SRBs, DRBs, or a combination of both. Additionally, UE 115-*a* may be initially configured to communicate with SCG 105-*a* on an initial primary path 205-*a* and to communicate with MCG 105-*b* on a secondary path 210, where an RLC may be also configured for initial primary path 205-*a* and secondary path 210 (e.g., an SCG RLC on path 205-*a* and an MCG RLC on path 210). As described herein, initial primary path 205-*a* may experience an SCG failure, which may trigger a configuration change of the split radio bearers at UE 115-*a* without waiting for the network to reconfigure the split radio bearers.

In some cases, as triggered by the SCG failure, UE 115-*a* may change the initial primary path 205-*a* to be a primary path 205-*b* in order to communicate with MCG 105-*b*. Secondary path 210 may then be discontinued. Additionally, UE 115—may set an uplink data split threshold to infinity or release the uplink data split threshold to ensure all buffered uplink data is transmitted to MCG 105-*b* instead of to SCG 105-*a*. Changing the primary path 205 from one cell group to the other may be referred to as an uplink switching behavior of UE 115-*a*.

Additionally or alternatively, after detecting the SCG failure, UE 115-*a* may perform an operation 215 to disable PDCP duplication (e.g., set ul-PdcpDuplication to FALSE). Prior to the SCG failure, UE 115-*a* may send duplicates of uplink data to both SCG 105-*a* and MCG 105-*b* to enhance redundancy and improve reliability. After the SCG failure, the split radio bearer associated with SCG 105-*a* may no longer operate correctly. As such, disabling the PDCP duplication may prevent UE 115-*a* from having to duplicate the data and wasting processing power since one of the radio bearers is no longer in operation.

After updating the configuration of the split radio bearers, UE 115-*a* may report to the network that the radio bearer configuration has been updated. Additionally, in some cases, the SCG failure may include an RLF, which may indicate an RLC failure, a random access failure, or a physical scenario failure as described above.

Figure 3:
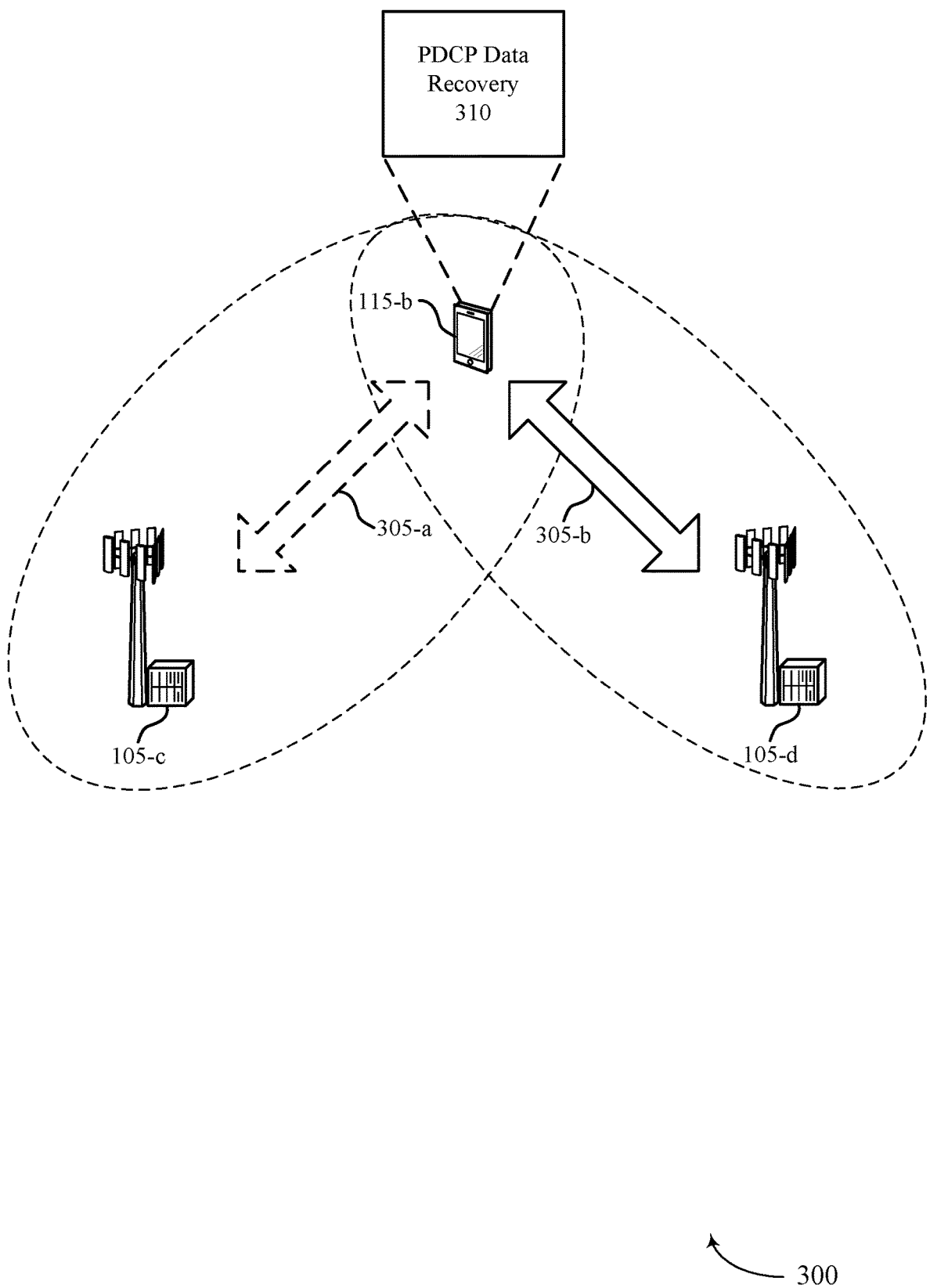

FIG. 3 illustrates an example of a wireless communications system 300 that supports SCG failure handling in accordance with various aspects of the present disclosure. In some examples, wireless communications system 300 may implement aspects of wireless communications systems 100 and 200. Wireless communications system 200 may include a base station 105-*c*, a base station 105-*d*, and a UE 115-*b*, which may be examples of base stations 105 and UEs 115 as described above with reference to FIGS. 1-2. Base station 105-*c* may be associated with an SCG and may be referred to as SCG 105-*c*. Base station 105-*d* may be associated with an MCG and may be referred to as MCG 105-*d*. Accordingly, UE 115-*b* may be configured to operate in DC and with split radio bearers. In some cases, the split radio bearers may be DRBs configured for RLC acknowledgement mode (AM). Additionally, UE 115-*b* may be initially configured to communicate with SCG 105-*c* on a path 305-*a* and to communicate with MCG 105-*b* on a path 305-*b*, where an RLC may be also configured for both paths 305 (e.g., an SCG RLC on path 305-*a* and an MCG RLC on path 305-*b*). As described herein, path 305-*a* may experience an SCG failure, which may trigger user plane handling at UE 115-*b* without waiting for the network to reconfigure the split radio bearers.

In some cases, UE 115-*b* may perform PDCP data recovery 310 when SCG failure occurs. For example, an amount of unacknowledged data may remain in an RLC buffer for SCG 105-*c* after the failure, and the network may not be able to receive the amount of unacknowledged data. Accordingly, PDCP data recovery 310 may enable UE 115-*b* to access the unacknowledged data and transmit it to MCG 105-*d* on path 305-*b* immediately without waiting for the network reconfiguration. Alternatively, UE 115-*b* may discard the unacknowledged data. For example, UE 115-*b* may be configured for a PDCP duplication prior to the SCG failure and transmit duplicates of data to both SCG 105-*c* and MCG 105-*d*. As such, the unacknowledged data in the RLC buffer for SCG 105-*c* may have already been transmitted and processed by MCG 105-*d*. Therefore, UE 115-*b* may discard the unacknowledged data instead of transmitting it a second time to MCG 105-*d*. In some cases, UE 115-*b* may be configured to automatically discard the unacknowledged data when an SCG failure occurs. Additionally or alternatively, UE 115-*b* may attempt an RLC reestablishment with the SCG RLC.

As described above, the SCG failure may include an RLF, which may indicate an RLC failure, a random access failure, or a physical scenario failure.

Figure 4:
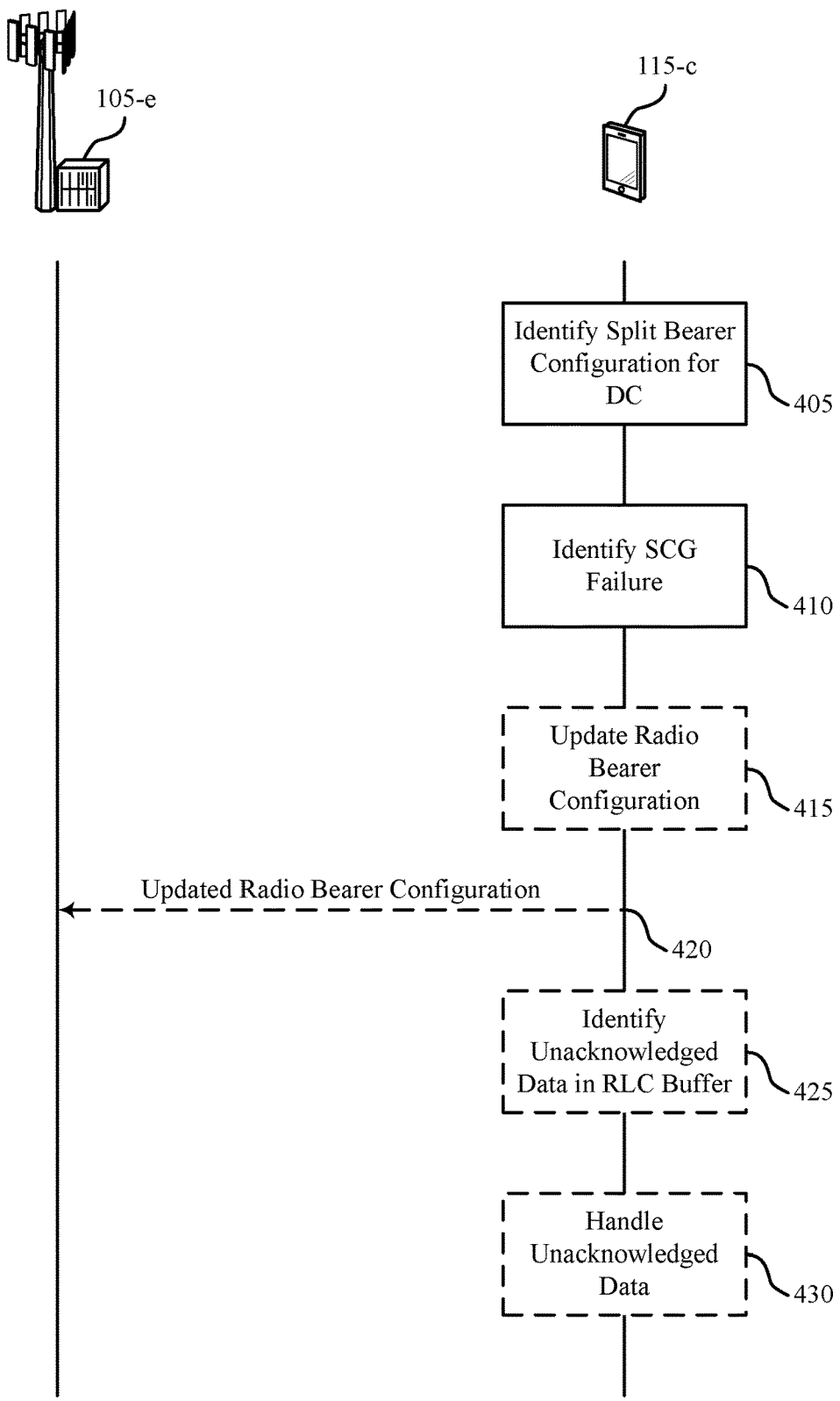
FIG. 4 illustrates an example of a process flow that supports SCG failure handling in accordance with aspects of the present disclosure.

FIG. 4 illustrates an example of a process flow 400 that supports SCG failure handling in accordance with various aspects of the present disclosure. In some examples, process flow 400 may implement aspects of wireless communications systems 100, 200, and 300. Process flow 400 may include a base station 105-*e* and a UE 115-*c*, which may be examples of base stations 105 and UEs 115 as described above with reference to FIGS. 1-3. As described herein, UE 115-*c* may be configured to operate in DC and with split radio bearers, such that one or more split radio bearers are associated with an MCG and one or more split radio bearers are associated with an SCG. In some cases, the one or more split radio bearers associated with the SCG may experience an SCG failure. Accordingly, UE 115-*c* may perform a configuration change of the split radio bearers or utilize user plane handling in order to mitigate the SCG failure.

In the following description of the process flow 400, the operations between UE 115-c and base station 105-e may be performed in different orders or at different times. Certain operations may also be left out of the process flow 400, or other operations may be added to the process flow 400. It is to be understood that while UE 115-c is shown performing a number of the operations of process flow 400, any wireless device may perform the operations shown.

At 405, UE 115-c may identify that it is configured with one or more split radio bearers under DC operation with an MCG and an SCG. In some cases, the one or more split radio bearers may include SRBs, DRBs, or a combination of both. Additionally or alternatively, the one or more split radio bearers may be DRBs configured for RLC AM.

At 410, UE 115-c may identify an SCG failure in communications with the SCG. In some cases, UE 115-c may identify an RLF in the communications with the SCG.

At 415, UE 115-c may autonomously update one or more radio bearer configurations of the one or more split radio bearers based on the SCG failure and without waiting for network reconfiguration of the one or more split radio bearers. In some cases, UE 115-c may change a primary path to be via the MCG. For example, UE 115-c may identify that the primary path of the radio bearer configuration prior to the SCG failure was via the SCG and may change the primary path to be via the MCG based on the identified SCG failure. Additionally or alternatively, UE 115-c may update an uplink data split threshold parameter such that buffered data is transmitted via the MCG instead of via the SCG. In some cases, UE 115-c may set the uplink data split threshold parameter to infinity. Alternatively, in some cases, UE 115-c may release the uplink data split threshold parameter. Additionally or alternatively, UE 115-c may deactivate PDCP duplication for the one or more split radio bearers after identifying that, prior to the SCG failure, PDCP duplication was active for the one or more split radio bearers.

At 420, UE 115-c may report to base station 105-e (e.g., the network) that the one or more radio bearer configurations have been updated.

Additionally or alternatively to 415 and 420, at 425, UE 115-c may identify that unacknowledged data is in an RLC buffer for communications via the SCG.

At 430, UE 115-c may handle the unacknowledged data based on the SCG failure and without waiting for network reconfiguration of the one or more split radio bearers. In some cases, UE 115-c may perform PDCP data recovery for the unacknowledged data in the RLC buffer. Alternatively, UE 115-c may discard the unacknowledged data in the RLC buffer. For example, UE 115-c may identify that the one or more split radio bearers are configured as bearers capable of performing duplication. Additionally, UE 115-c may identify that, prior to the SCG failure, PDCP duplication was active for the one or more split radio bearers and may discard the unacknowledged data in the RLC buffer based on PDCP duplication being active for the one or more split radio bearers. Alternatively, UE 115-c may identify that the one or more split radio bearers are configured with an indication to automatically discard the unacknowledged data in the RLC buffer based on the identified SCG failure and may discard the unacknowledged data in the RLC buffer based on the automatic discard indication. In some cases, UE 115-c may attempt RLC reestablishment with the SCG RLC.

Figure 5:
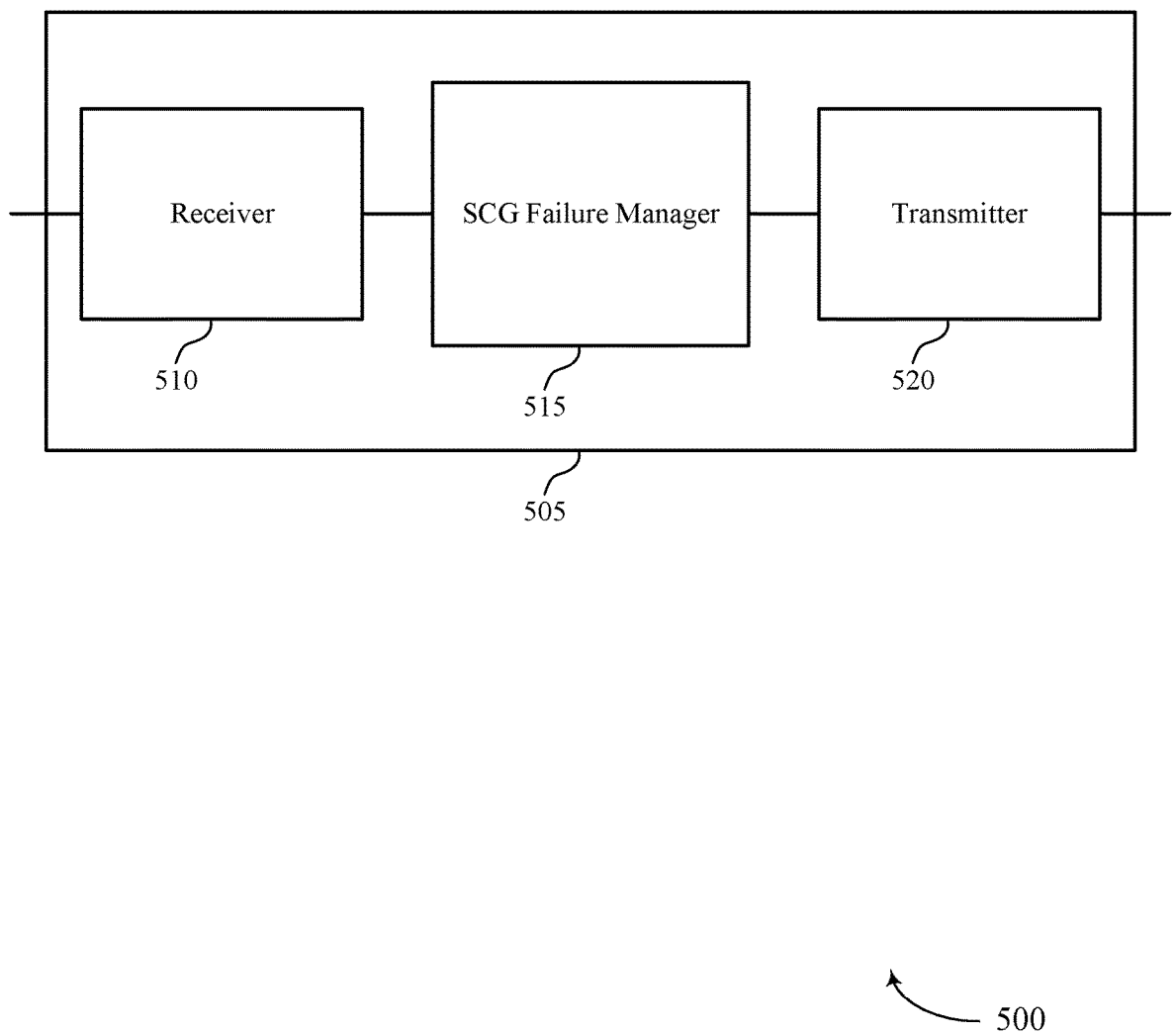
FIGS. 5 through 7 show block diagrams of a device that supports SCG failure handling in accordance with aspects of the present disclosure.

FIG. 5 shows a block diagram 500 of a wireless device 505 that supports SCG failure handling in accordance with aspects of the present disclosure. Wireless device 505 may be an example of aspects of a UE 115 as described herein. Wireless device 505 may include receiver 510, SCG failure manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to SCG failure handling, etc.). Information may be passed on to other components of the device. The receiver 510 may be an example of aspects of the transceiver 835 described with reference to FIG. 8. The receiver 510 may utilize a single antenna or a set of antennas.

SCG failure manager 515 may be an example of aspects of the SCG failure manager 815 described with reference to FIG. 8.

SCG failure manager 515 and/or at least some of its various sub-components may be implemented in hardware, software executed by a processor, firmware, or any combination thereof. If implemented in software executed by a processor, the functions of the SCG failure manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The SCG failure manager 515 and/or at least some of its various sub-components may be physically located at various positions, including being distributed such that portions of functions are implemented at different physical locations by one or more physical devices. In some examples, SCG failure manager 515 and/or at least some of its various sub-components may be a separate and distinct component in accordance with various aspects of the present disclosure. In other examples, SCG failure manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

SCG failure manager 515 may identify that the UE is configured with one or more split radio bearers under DC operation with an MCG and an SCG and identify, at the UE, an SCG failure in communications with the SCG. In some cases, SCG failure manager 515 may update, autonomously at the UE, one or more radio bearer configurations of the one or more split radio bearers based on the SCG failure and without waiting for network reconfiguration of the one or more split radio bearers. Additionally or alternatively, SCG failure manager 515 may identify that unacknowledged data is in an RLC buffer for communications via the SCG. Accordingly, SCG failure manager 515 may handle the unacknowledged data based on the SCG failure and without waiting for network reconfiguration of the one or more split radio bearers.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may utilize a single antenna or a set of antennas.

Figure 6:
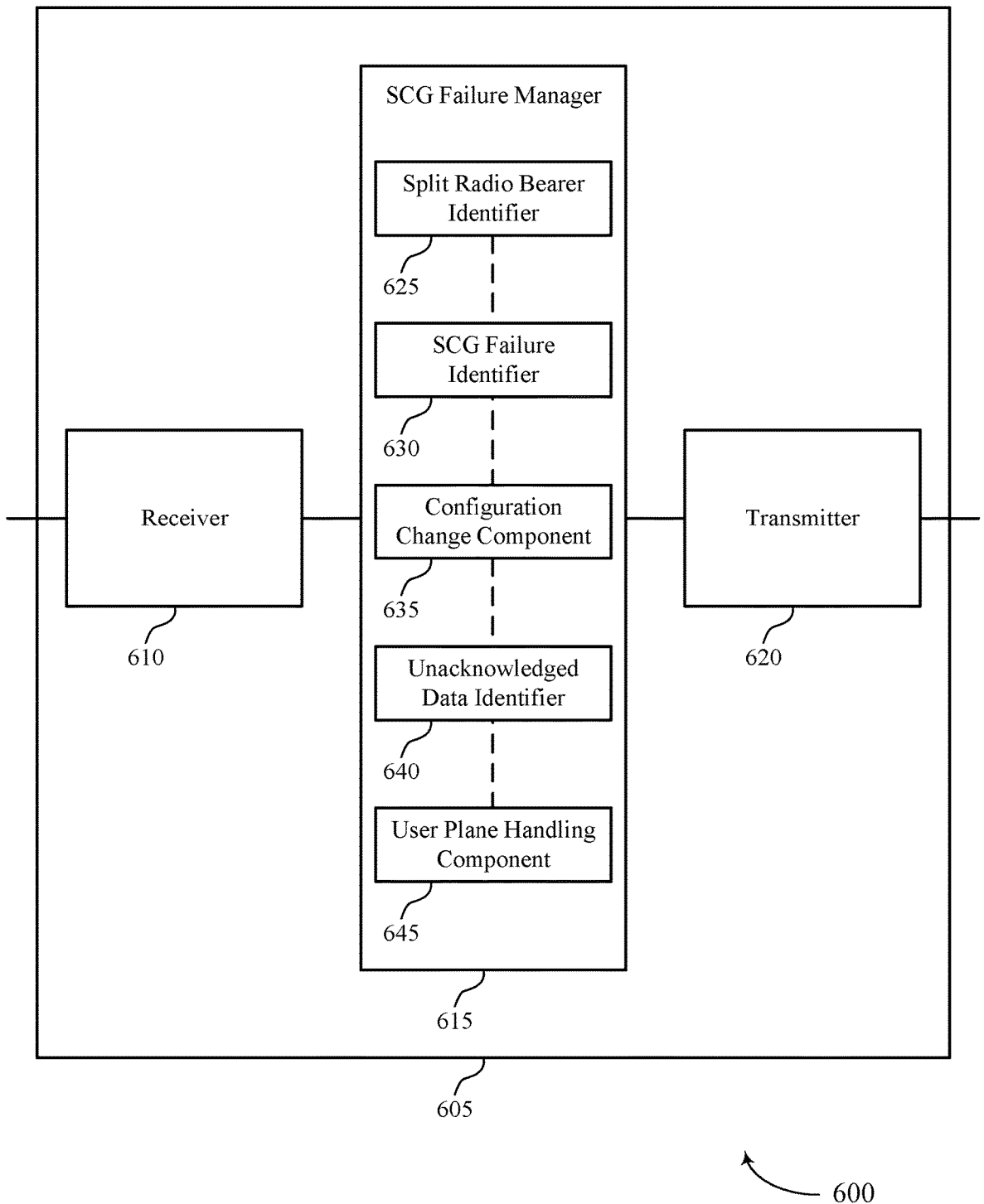

FIG. 6 shows a block diagram 600 of a wireless device 605 that supports SCG failure handling in accordance with aspects of the present disclosure. Wireless device 605 may be an example of aspects of a wireless device 505 or a UE 115 as described with reference to FIG. 5. Wireless device 605 may include receiver 610, SCG failure manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to SCG failure handling, etc.). Information may be passed on to other components of the device. The receiver 610 may be an example of aspects of the transceiver 835 described with reference to FIG. 8. The receiver 610 may utilize a single antenna or a set of antennas.

SCG failure manager 615 may be an example of aspects of the SCG failure manager 815 described with reference to FIG. 8.

SCG failure manager 615 may also include split radio bearer identifier 625, SCG failure identifier 630, configuration change component 635, unacknowledged data identifier 640, and user plane handling component 645.

Split radio bearer identifier 625 may identify that the UE is configured with one or more split radio bearers under DC operation with an MCG and an SCG. In some cases, split radio bearer identifier 625 may identify that the one or more split radio bearers are DRBs configured for RLC AM. Additionally or alternatively, the one or more split radio bearers may include SRBs, DRBs, or a combination of both.

SCG failure identifier 630 may identify, at the UE, an SCG failure in communications with the SCG. In some cases, identifying the SCG failure may include identifying a RLF in the communications with the SCG.

Configuration change component 635 may update, autonomously at the UE, one or more radio bearer configurations of the one or more split radio bearers based on the SCG failure and without waiting for network reconfiguration of the one or more split radio bearers. Accordingly, configuration change component 635 may report to the network that the one or more radio bearer configurations have been updated.

Unacknowledged data identifier 640 may identify that unacknowledged data is in an RLC buffer for communications via the SCG.

User plane handling component 645 may handle the unacknowledged data based on the SCG failure and without waiting for network reconfiguration of the one or more split radio bearers.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may utilize a single antenna or a set of antennas.

Figure 7:
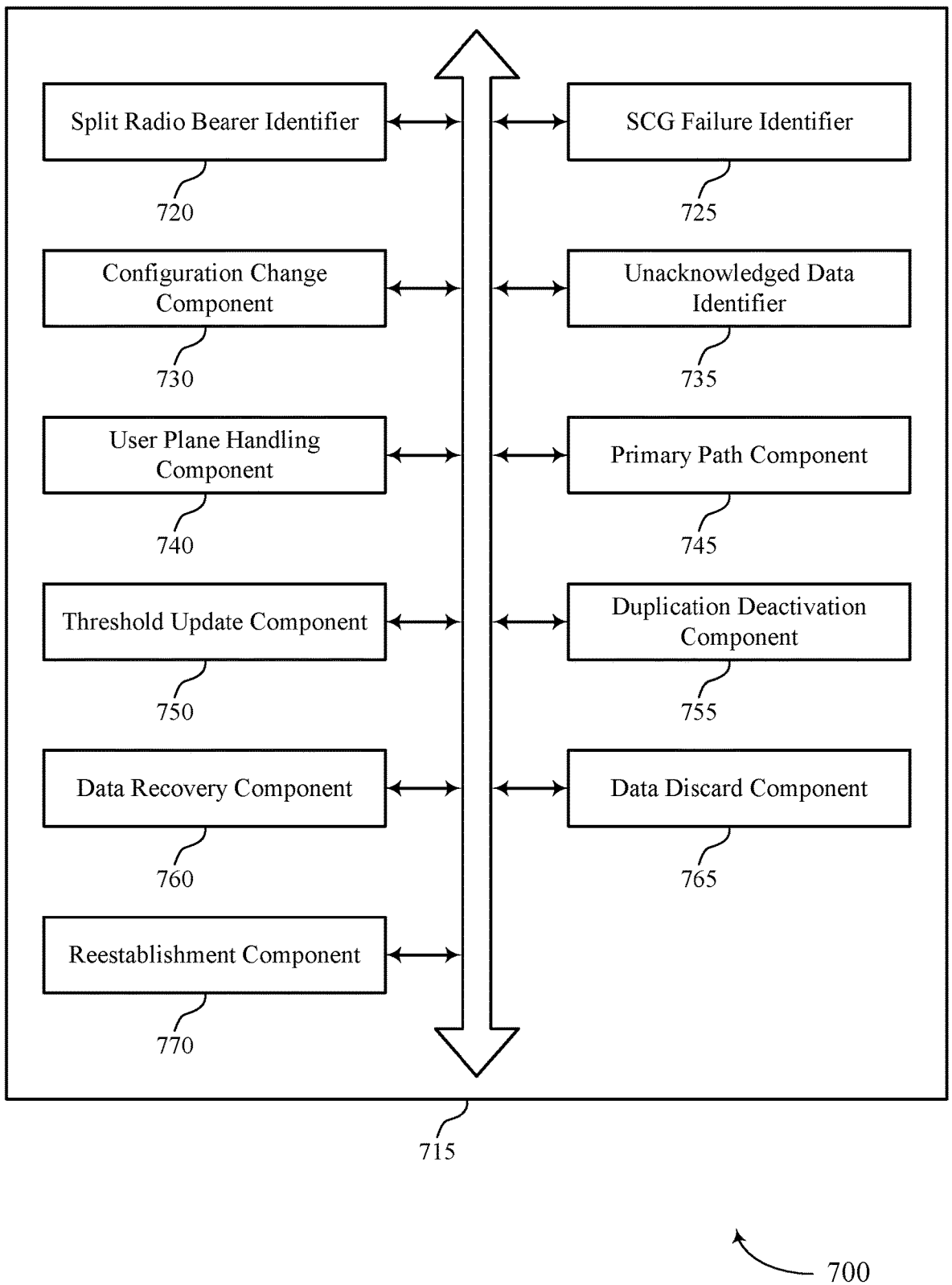

FIG. 7 shows a block diagram 700 of an SCG failure manager 715 that supports SCG failure handling in accordance with aspects of the present disclosure. The SCG failure manager 715 may be an example of aspects of an SCG failure manager 515, an SCG failure manager 615, or an SCG failure manager 815 described with reference to FIGS. 5, 6, and 8. The SCG failure manager 715 may include split radio bearer identifier 720, SCG failure identifier 725, configuration change component 730, unacknowledged data identifier 735, user plane handling component 740, primary path component 745, threshold update component 750, duplication deactivation component 755, data recovery component 760, data discard component 765, and reestablishment component 770. Each of these modules may communicate, directly or indirectly, with one another (e.g., via one or more buses).

Split radio bearer identifier 720 may identify that the UE is configured with one or more split radio bearers under DC operation with an MCG and an SCG. In some cases, split radio bearer identifier 720 may identify that the one or more split radio bearers are DRBs configured for RLC AM. Additionally or alternatively, the one or more split radio bearers may include SRBs, DRBs, or a combination of both.

SCG failure identifier 725 may identify, at the UE, an SCG failure in communications with the SCG. In some cases, identifying the SCG failure may include identifying a RLF in the communications with the SCG.

Configuration change component 730 may update, autonomously at the UE, one or more radio bearer configurations of the one or more split radio bearers based on the SCG failure and without waiting for network reconfiguration of the one or more split radio bearers. Accordingly, configuration change component 730 may report to the network that the one or more radio bearer configurations have been updated.

Unacknowledged data identifier 735 may identify that unacknowledged data is in an RLC buffer for communications via the SCG.

User plane handling component 740 may handle the unacknowledged data based on the SCG failure and without waiting for network reconfiguration of the one or more split radio bearers.

Primary path component 745 may change a primary path to be via the MCG. Additionally, primary path component 745 may identify that the primary path of the radio bearer configuration prior to the SCG failure was via the SCG, where changing the primary path to be via the MCG is based on the identified SCG failure.

Threshold update component 750 may update an uplink data split threshold parameter such that buffered data is transmitted via the MCG instead of via the SCG. In some cases, updating the uplink data split threshold parameter may include setting the uplink data split threshold parameter to infinity. Alternatively, updating the uplink data split threshold parameter may include releasing the uplink data split threshold parameter.

Duplication deactivation component 755 may deactivate PDCP duplication for the one or more split radio bearers. Additionally, duplication deactivation component 755 may identify that, prior to the SCG failure, PDCP duplication was active for the one or more split radio bearers.

Data recovery component 760 may perform PDCP data recovery at the UE for the unacknowledged data in the RLC buffer.

Data discard component 765 may discard the unacknowledged data in the RLC buffer. Additionally, data discard component 765 may identify that the one or more split radio bearers are configured as bearers capable of performing duplication. Accordingly, data discard component 765 may identify that, prior to the SCG failure, PDCP duplication was active for the one or more split radio bearers, where the discarding of the unacknowledged data in the RLC buffer is based on PDCP duplication being active for the one or more split radio bearers. Alternatively, in some cases, data discard component 765 may identify that the one or more split radio bearers are configured with an indication to automatically discard the unacknowledged data in the RLC buffer based on the identified SCG failure.

Reestablishment component 770 may attempt RLC reestablishment with an RLC for the SCG.

Figure 8:
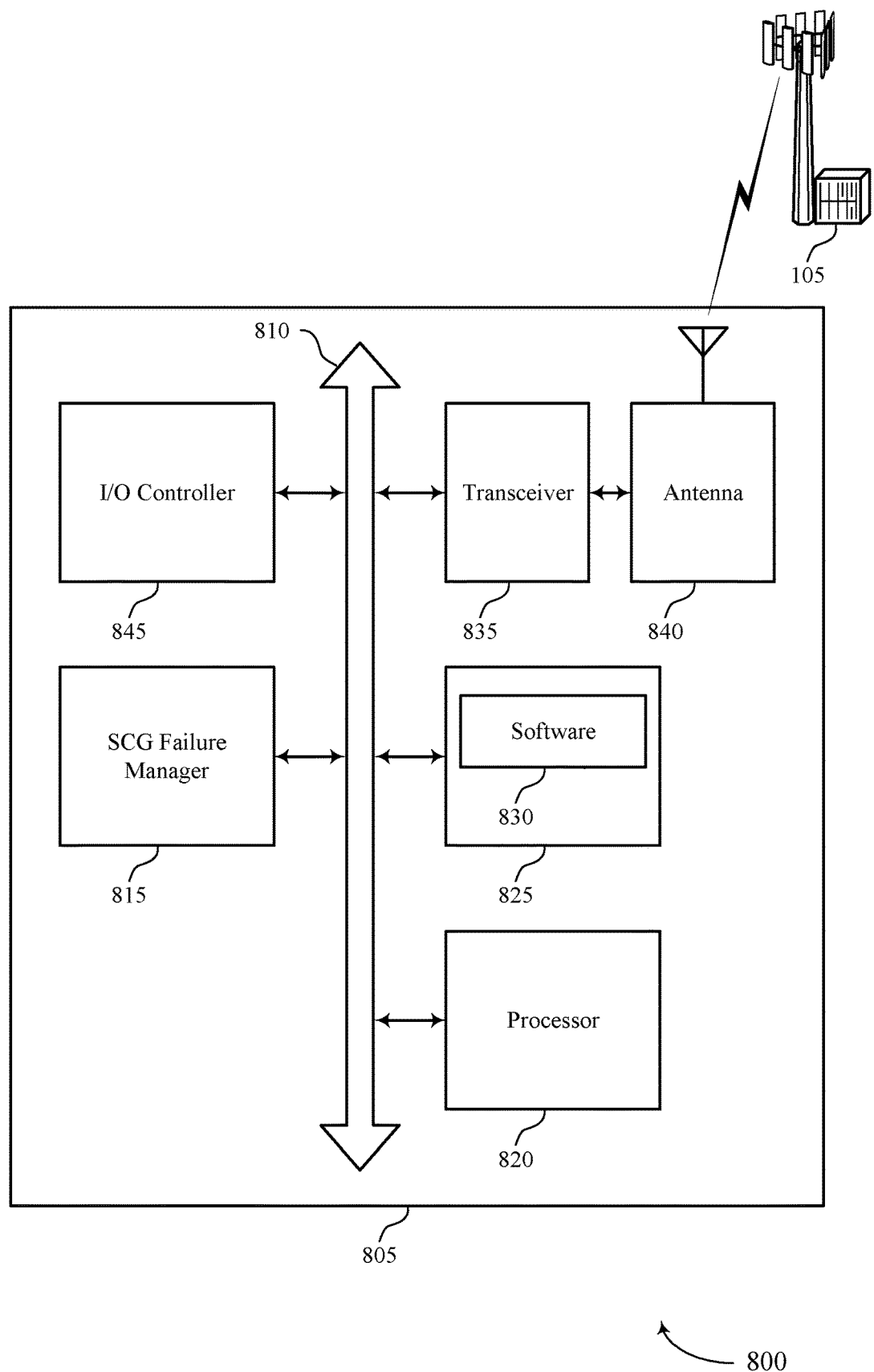
FIG. 8 illustrates a block diagram of a system including a user equipment (UE) that supports SCG failure handling in accordance with aspects of the present disclosure.

FIG. 8 shows a diagram of a system 800 including a device 805 that supports SCG failure handling in accordance with aspects of the present disclosure. Device 805 may be an example of or include the components of wireless device 505, wireless device 605, or a UE 115 as described above, e.g., with reference to FIGS. 5 and 6. Device 805 may include components for bi-directional voice and data communications including components for transmitting and receiving communications, including SCG failure manager 815, processor 820, memory 825, software 830, transceiver 835, antenna 840, and I/O controller 845. These components may be in electronic communication via one or more buses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting SCG failure handling).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware or software operation such as the interaction with peripheral components or devices.

Software 830 may include code to implement aspects of the present disclosure, including code to support SCG failure handling. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
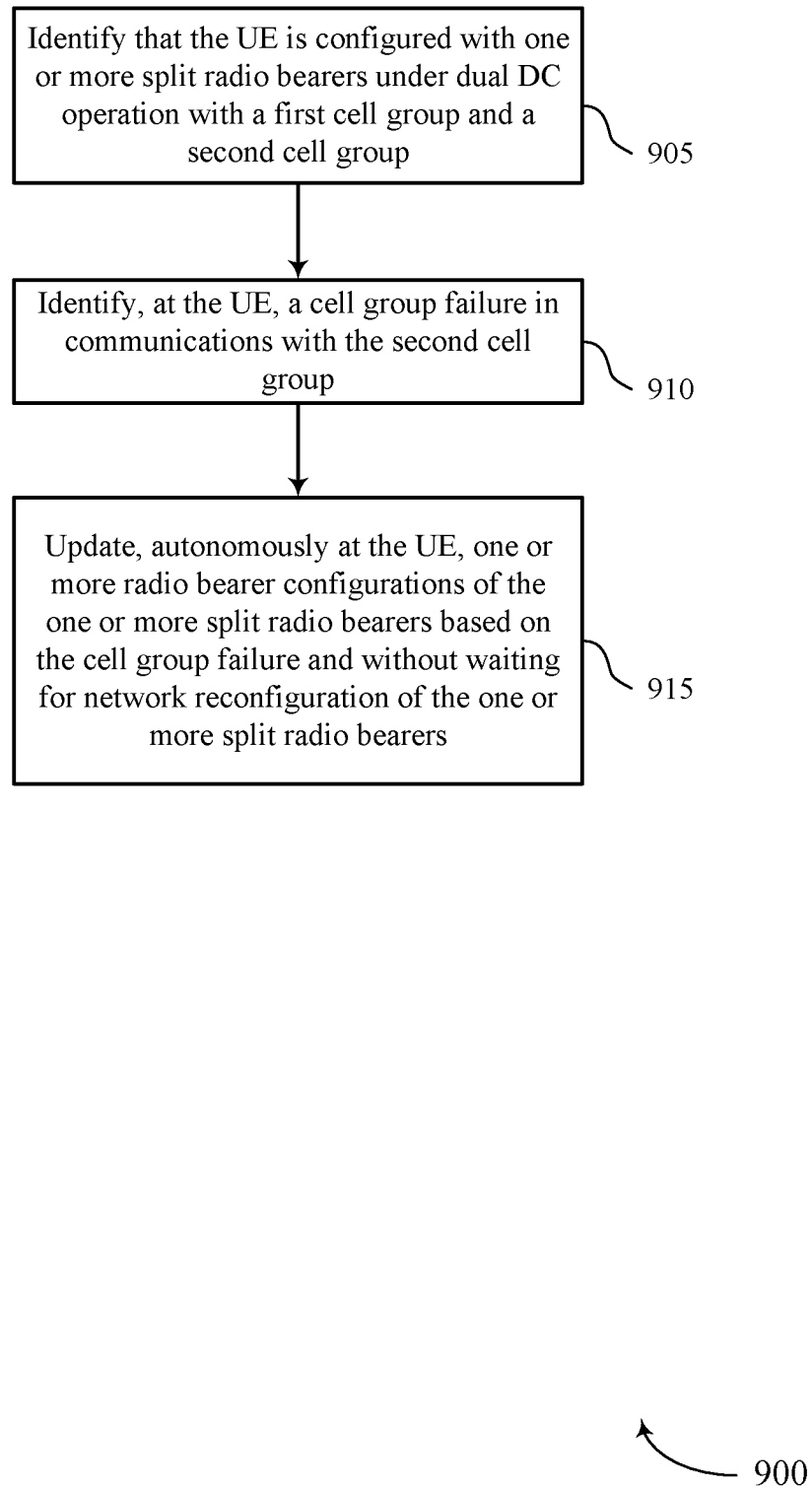
FIGS. 9 through 14 illustrate methods for SCG failure handling in accordance with aspects of the present disclosure.

FIG. 9 shows a flowchart illustrating a method 900 for SCG failure handling in accordance with aspects of the present disclosure. The operations of method 900 may be implemented by a UE 115 or its components as described herein. For example, the operations of method 900 may be performed by an SCG failure manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 905 the UE 115 may identify that the UE is configured with one or more split radio bearers under DC operation with a first cell group (e.g., an MCG) and a second cell group (e.g., an SCG). The operations of 905 may be performed according to the methods described herein. In certain examples, aspects of the operations of 905 may be performed by a split radio bearer identifier as described with reference to FIGS. 5 through 8.

At 910 the UE 115 may identify, at the UE, a cell group failure (e.g., an SCG failure) in communications with the second cell group. The operations of 910 may be performed according to the methods described herein. In certain examples, aspects of the operations of 910 may be performed by an SCG failure identifier as described with reference to FIGS. 5 through 8.

At 915 the UE 115 may update, autonomously at the UE, one or more radio bearer configurations of the one or more split radio bearers based on the cell group failure and without waiting for network reconfiguration of the one or more split radio bearers. The operations of 915 may be performed according to the methods described herein. In certain examples, aspects of the operations of 915 may be performed by a configuration change component as described with reference to FIGS. 5 through 8.

Figure 10:
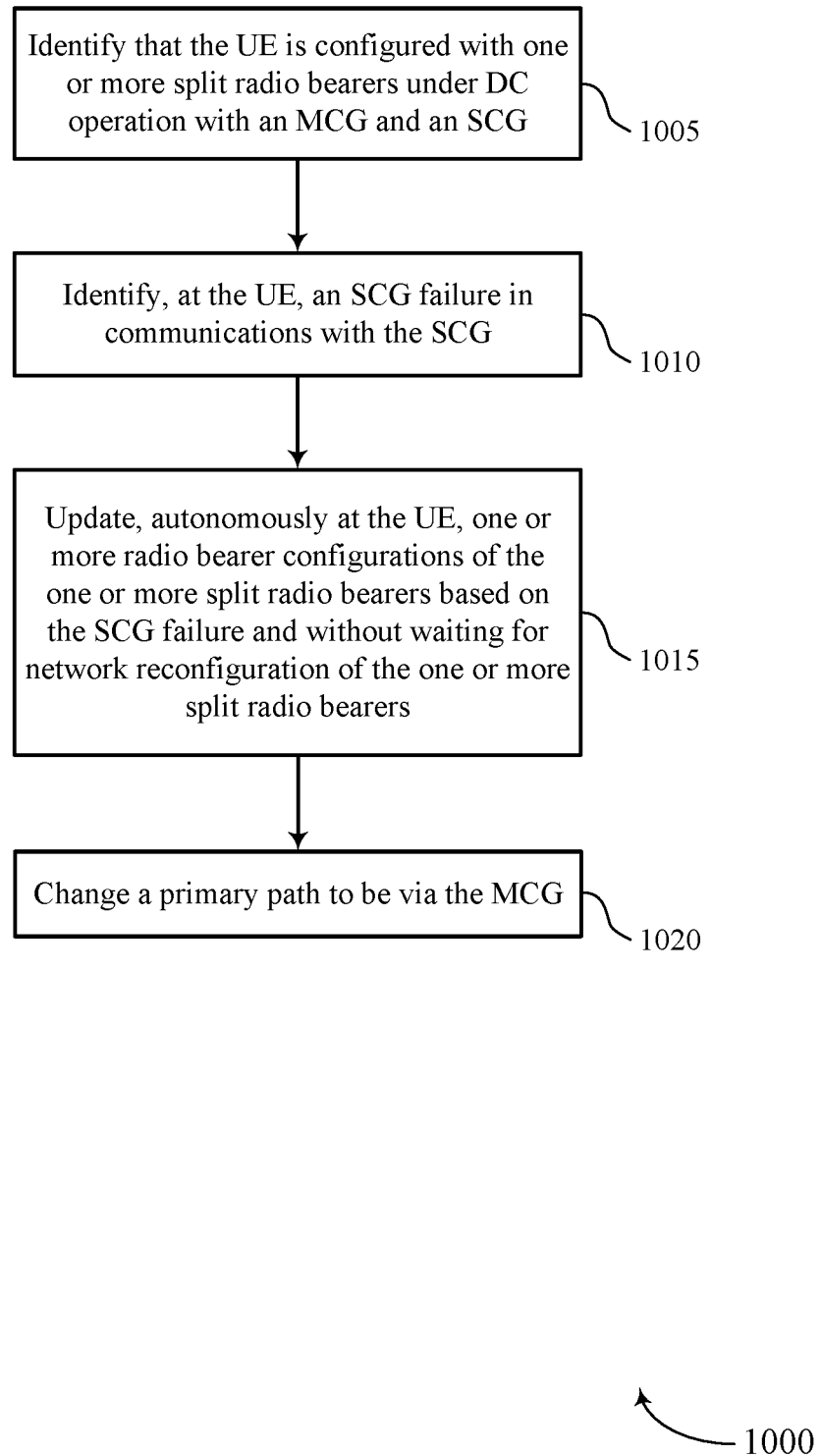

FIG. 10 shows a flowchart illustrating a method 1000 for SCG failure handling in accordance with aspects of the present disclosure. The operations of method 1000 may be implemented by a UE 115 or its components as described herein. For example, the operations of method 1000 may be performed by an SCG failure manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1005 the UE 115 may identify that the UE is configured with one or more split radio bearers under DC operation with an MCG and an SCG. The operations of 1005 may be performed according to the methods described herein. In certain examples, aspects of the operations of 1005 may be performed by a split radio bearer identifier as described with reference to FIGS. 5 through 8.

At 1010 the UE 115 may identify, at the UE, an SCG failure in communications with the SCG. The operations of 1010 may be performed according to the methods described herein. In certain examples, aspects of the operations of 1010 may be performed by an SCG failure identifier as described with reference to FIGS. 5 through 8.

At 1015 the UE 115 may update, autonomously at the UE, one or more radio bearer configurations of the one or more split radio bearers based on the SCG failure and without waiting for network reconfiguration of the one or more split radio bearers. The operations of 1015 may be performed according to the methods described herein. In certain examples, aspects of the operations of 1015 may be performed by a configuration change component as described with reference to FIGS. 5 through 8.

At 1020 the UE 115 may change a primary path to be via the MCG. The operations of 1020 may be performed according to the methods described herein. In certain examples, aspects of the operations of 1020 may be performed by a primary path component as described with reference to FIGS. 5 through 8.

Figure 11:
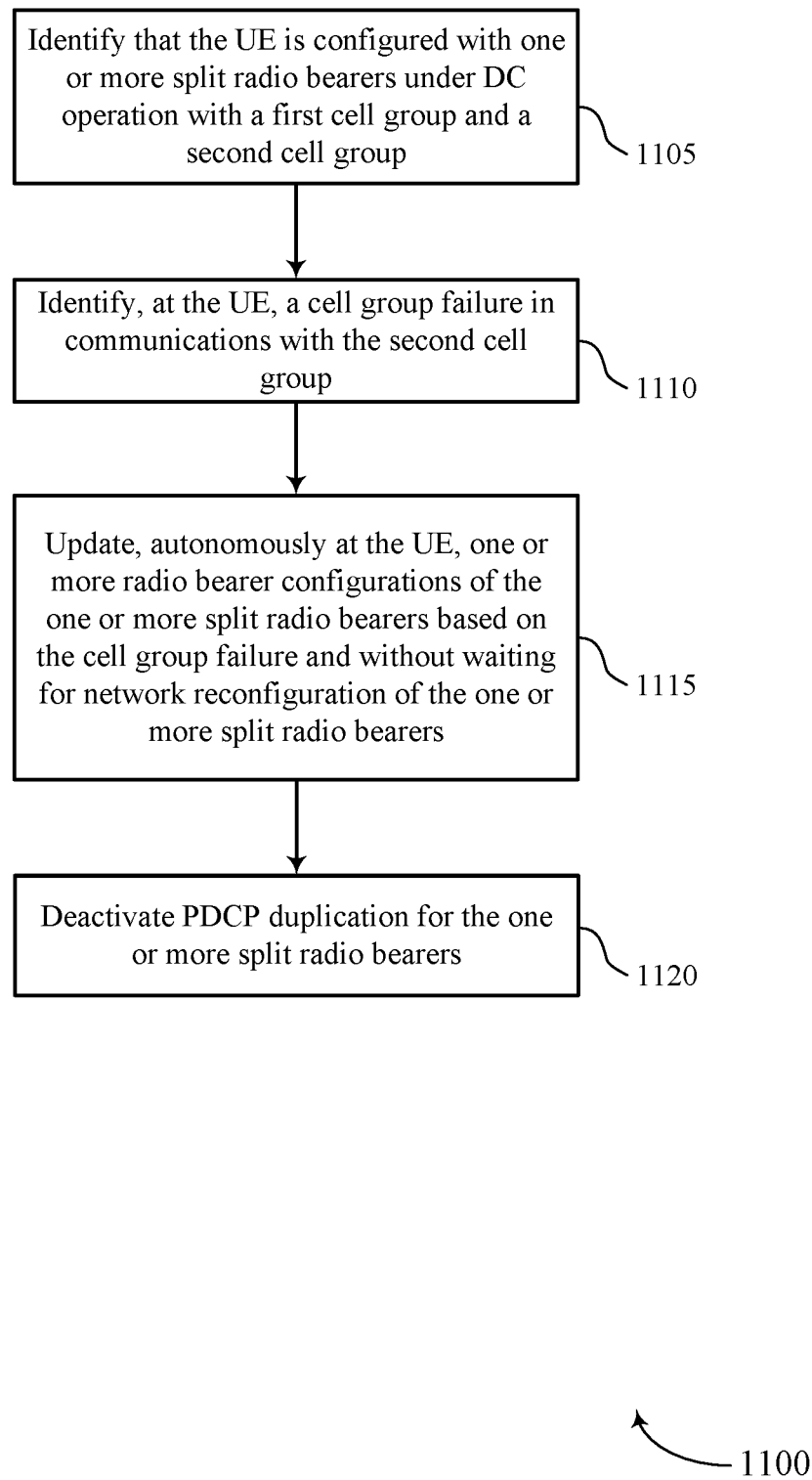

FIG. 11 shows a flowchart illustrating a method 1100 for SCG failure handling in accordance with aspects of the present disclosure. The operations of method 1100 may be implemented by a UE 115 or its components as described herein. For example, the operations of method 1100 may be performed by an SCG failure manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1105 the UE 115 may identify that the UE is configured with one or more split radio bearers under DC operation with a first cell group (e.g., an MCG) and a second cell group (e.g., an SCG). The operations of 1105 may be performed according to the methods described herein. In certain examples, aspects of the operations of 1105 may be performed by a split radio bearer identifier as described with reference to FIGS. 5 through 8.

At 1110 the UE 115 may identify, at the UE, a cell group failure (e.g., an SCG failure) in communications with the second cell group. The operations of 1110 may be performed according to the methods described herein. In certain examples, aspects of the operations of 1110 may be performed by an SCG failure identifier as described with reference to FIGS. 5 through 8.

At 1115 the UE 115 may update, autonomously at the UE, one or more radio bearer configurations of the one or more split radio bearers based on the cell group failure and without waiting for network reconfiguration of the one or more split radio bearers. The operations of 1115 may be performed according to the methods described herein. In certain examples, aspects of the operations of 1115 may be performed by a configuration change component as described with reference to FIGS. 5 through 8.

At 1120 the UE 115 may deactivate packet data convergence protocol (PDCP) duplication for the one or more split radio bearers. The operations of 1120 may be performed according to the methods described herein. In certain examples, aspects of the operations of 1020 may be performed by a duplication deactivation component as described with reference to FIGS. 5 through 8.

Figure 12:
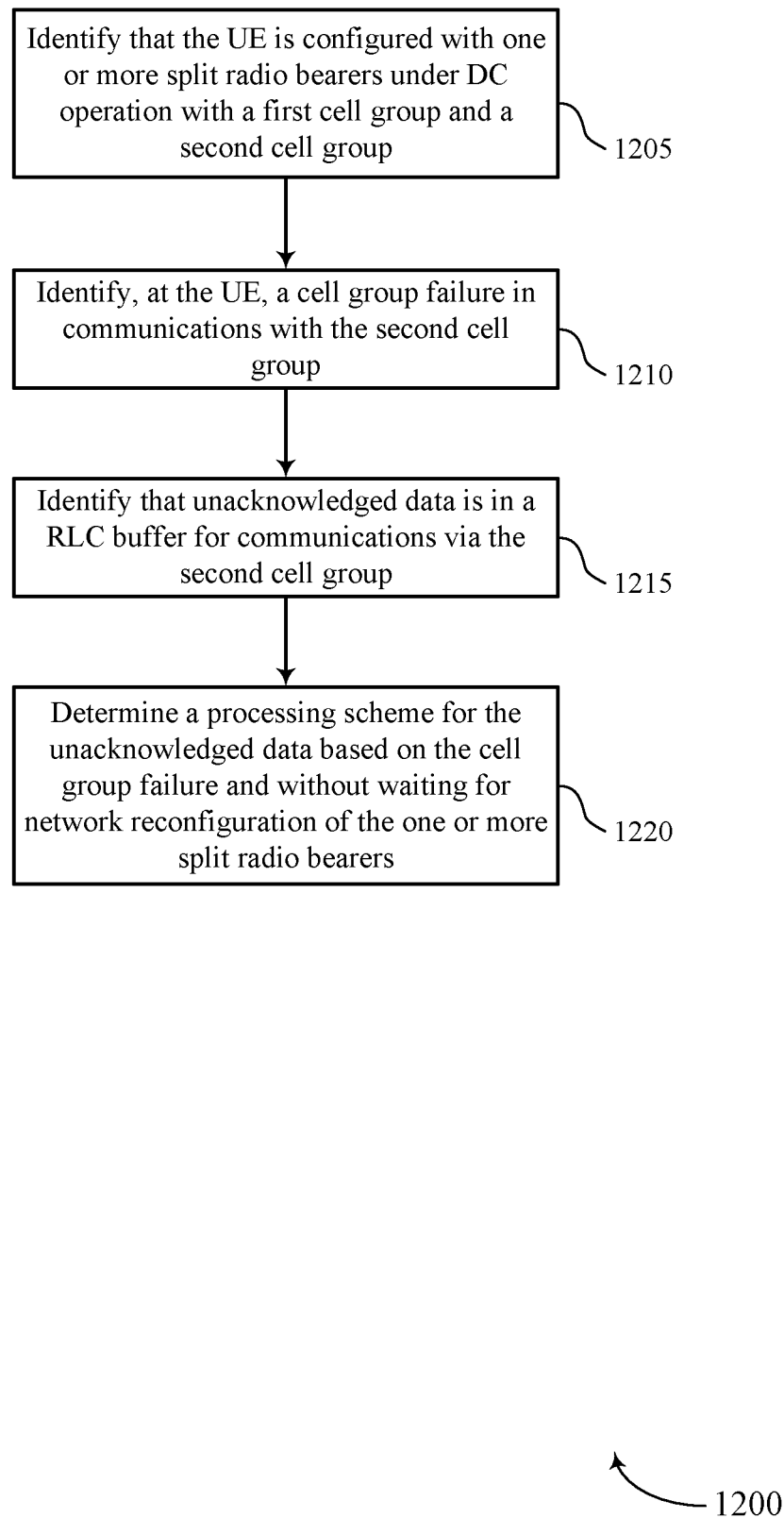

FIG. 12 shows a flowchart illustrating a method 1200 for SCG failure handling in accordance with aspects of the present disclosure. The operations of method 1200 may be implemented by a UE 115 or its components as described herein. For example, the operations of method 1200 may be performed by an SCG failure manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1205 the UE 115 may identify that the UE is configured with one or more split radio bearers under DC operation with a first cell group (e.g., an MCG) and a second cell group (e.g., an SCG). The operations of 1205 may be performed according to the methods described herein. In certain examples, aspects of the operations of 1205 may be performed by a split radio bearer identifier as described with reference to FIGS. 5 through 8.

At 1210 the UE 115 may identify, at the UE, a cell group failure (e.g., an SCG failure) in communications with the second cell group. The operations of 1210 may be performed according to the methods described herein. In certain examples, aspects of the operations of 1210 may be performed by an SCG failure identifier as described with reference to FIGS. 5 through 8.

At 1215 the UE 115 may identify that unacknowledged data is in an RLC buffer for communications via the second cell group. The operations of 1215 may be performed according to the methods described herein. In certain examples, aspects of the operations of 1215 may be performed by a unacknowledged data identifier as described with reference to FIGS. 5 through 8.

At 1220 the UE 115 may determine a processing scheme for the unacknowledged data based on the cell group failure and without waiting for network reconfiguration of the one or more split radio bearers. The operations of 1220 may be performed according to the methods described herein. In certain examples, aspects of the operations of 1220 may be performed by a user plane handling component as described with reference to FIGS. 5 through 8.

Figure 13:
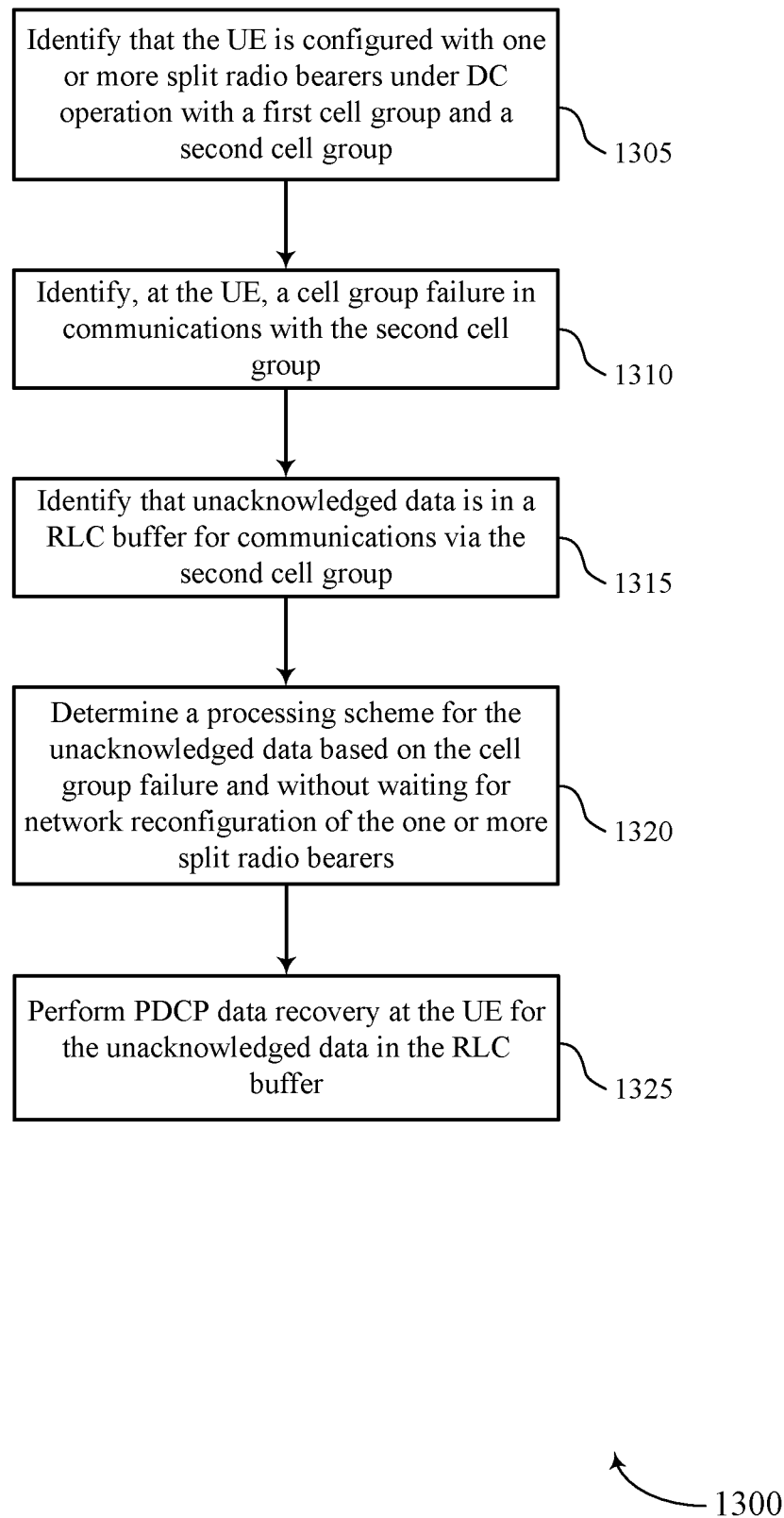

FIG. 13 shows a flowchart illustrating a method 1300 for SCG failure handling in accordance with aspects of the present disclosure. The operations of method 1300 may be implemented by a UE 115 or its components as described herein. For example, the operations of method 1300 may be performed by an SCG failure manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1305 the UE 115 may identify that the UE is configured with one or more split radio bearers under DC operation with a first cell group (e.g., an MCG) and a second cell group (e.g., an SCG). The operations of 1305 may be performed according to the methods described herein. In certain examples, aspects of the operations of 1305 may be performed by a split radio bearer identifier as described with reference to FIGS. 5 through 8.

At 1310 the UE 115 may identify, at the UE, a cell group failure (e.g., an SCG failure) in communications with the second cell group. The operations of 1310 may be performed according to the methods described herein. In certain examples, aspects of the operations of 1310 may be performed by an SCG failure identifier as described with reference to FIGS. 5 through 8.

At 1315 the UE 115 may identify that unacknowledged data is in an RLC buffer for communications via the second cell group. The operations of 1315 may be performed according to the methods described herein. In certain examples, aspects of the operations of 1315 may be performed by a unacknowledged data identifier as described with reference to FIGS. 5 through 8.

At 1320 the UE 115 may determine a processing scheme for the unacknowledged data based on the cell group failure and without waiting for network reconfiguration of the one or more split radio bearers. The operations of 1320 may be performed according to the methods described herein. In certain examples, aspects of the operations of 1320 may be performed by a user plane handling component as described with reference to FIGS. 5 through 8.

At 1325 the UE 115 may perform PDCP data recovery at the UE for the unacknowledged data in the RLC buffer. The operations of 1325 may be performed according to the methods described herein. In certain examples, aspects of the operations of 1325 may be performed by a data recovery component as described with reference to FIGS. 5 through 8.

Figure 14:
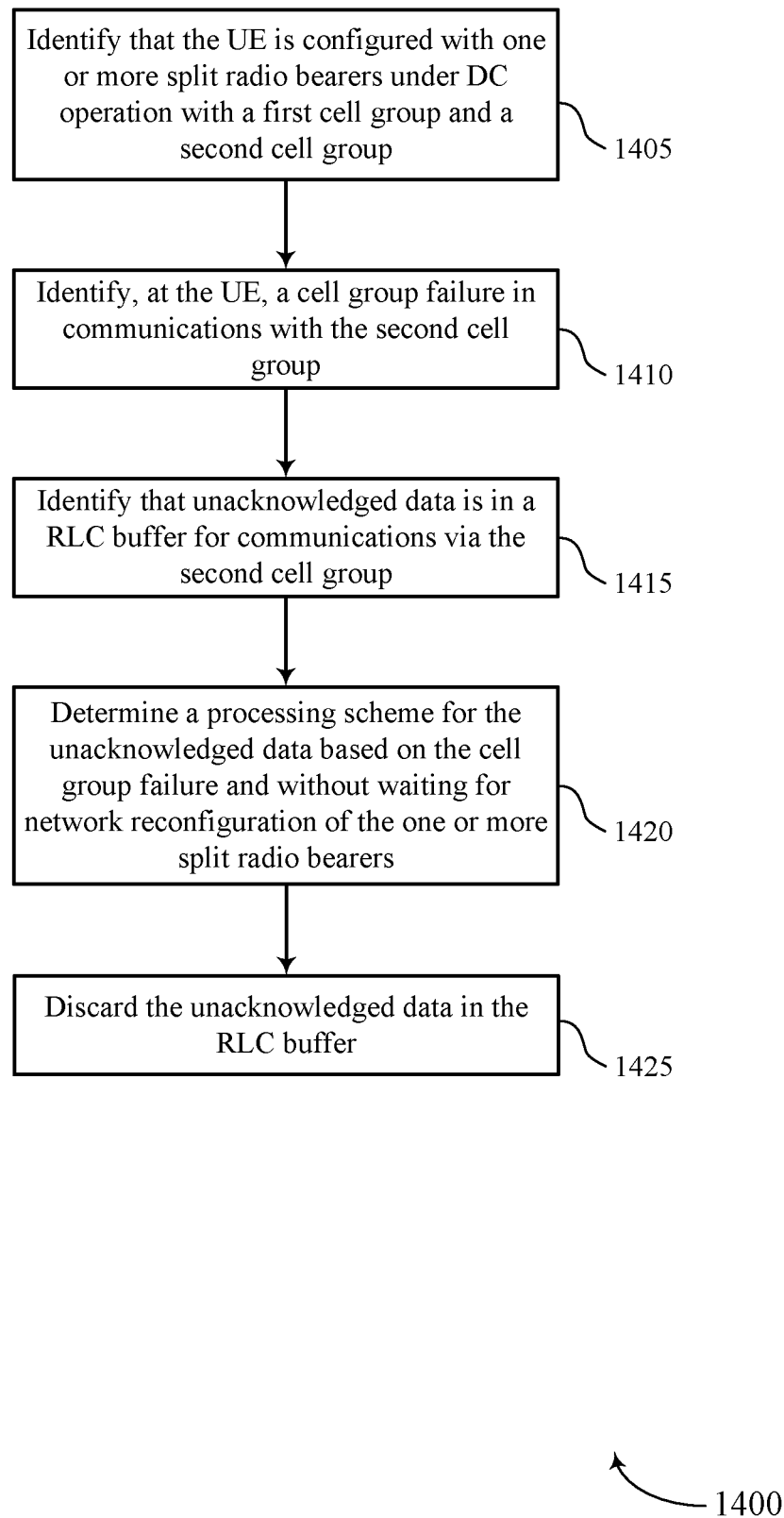

FIG. 14 shows a flowchart illustrating a method 1400 for SCG failure handling in accordance with aspects of the present disclosure. The operations of method 1400 may be implemented by a UE 115 or its components as described herein. For example, the operations of method 1400 may be performed by an SCG failure manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may identify that the UE is configured with one or more split radio bearers under DC operation with a first cell group (e.g., an MCG) and a second cell group (e.g., an SCG). The operations of 1405 may be performed according to the methods described herein. In certain examples, aspects of the operations of 1405 may be performed by a split radio bearer identifier as described with reference to FIGS. 5 through 8.

At 1410 the UE 115 may identify, at the UE, a cell group failure (e.g., an SCG failure) in communications with the second cell group. The operations of 1410 may be performed according to the methods described herein. In certain examples, aspects of the operations of 1410 may be performed by an SCG failure identifier as described with reference to FIGS. 5 through 8.

At 1415 the UE 115 may identify that unacknowledged data is in an RLC buffer for communications via the second cell group. The operations of 1415 may be performed according to the methods described herein. In certain examples, aspects of the operations of 1415 may be performed by a unacknowledged data identifier as described with reference to FIGS. 5 through 8.

At 1420 the UE 115 may determine a processing scheme for the unacknowledged data based on the cell group failure and without waiting for network reconfiguration of the one or more split radio bearers. The operations of 1420 may be performed according to the methods described herein. In certain examples, aspects of the operations of 1420 may be performed by a user plane handling component as described with reference to FIGS. 5 through 8.

At 1425 the UE 115 may discard the unacknowledged data in the RLC buffer. The operations of 1425 may be performed according to the methods described herein. In certain examples, aspects of the operations of 1425 may be performed by a data discard component as described with reference to FIGS. 5 through 8.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is configured with one or more split radio bearers under dual connectivity (DC) operation with a master cell group (MCG) and a secondary cell group (SCG);
    identifying, at the UE, an SCG failure in communications with the SCG;

determining a processing scheme for unacknowledged data for the SCG based at least in part on the SCG failure and without waiting for network reconfiguration of the one or more split radio bearers, wherein the determined processing scheme comprises attempting radio link control (RLC) reestablishment with an RLC for the SCG; and attempting RLC reestablishment with an RLC for the SCG based at least in part on the determined processing scheme.

2. The method of claim 1, further comprising:
identifying that the one or more split radio bearers are data radio bearers (DRBs) configured for RLC acknowledgement mode (AM).

3. The method of claim 1, wherein identifying the SCG failure comprises:
identifying a radio link failure (RLF) in the communications with the SCG.

4. The method of claim 1, wherein the determined processing scheme further comprises:
performing packet data convergence protocol (PDCP) data recovery at the UE for the unacknowledged data.

5. The method of claim 1, further comprising:
identifying that the one or more split radio bearers are configured as bearers capable of performing duplication.

6. The method of claim 5, further comprising:
identifying that, prior to the SCG failure, packet data convergence protocol (PDCP) duplication was active for the one or more split radio bearers.

7. An apparatus for wireless communication at a user equipment (UE), comprising:
a processor,
memory coupled with the processor; and
instructions stored in the memory and executable by the processor to cause the apparatus to:
identify that the UE is configured with one or more split radio bearers under dual connectivity (DC) operation with a master cell group (MCG) and a secondary cell group (SCG);
identify, at the UE, an SCG failure in communications with the SCG;
determine a processing scheme for unacknowledged data for the SCG based at least in part on the SCG failure and without waiting for network reconfiguration of the one or more split radio bearers, wherein the determined processing scheme comprises attempting radio link control (RLC) reestablishment with an RLC for the SCG; and
attempt RLC reestablishment with an RLC for the SCG based at least in part on the determined processing scheme.

8. The apparatus of claim 7, wherein the instructions are further executable by the processor to cause the apparatus to:
identify that the one or more split radio bearers are data radio bearers (DRBs) configured for RLC acknowledgement mode (AM).

9. The apparatus of claim 7, wherein the instructions to identify the SCG failure are executable by the processor to cause the apparatus to:
identify a radio link failure (RLF) in the communications with the SCG.

10. The apparatus of claim 7, wherein the determined processing scheme further comprises instructions stored in the memory and executable by the processor to cause the apparatus to:
perform packet data convergence protocol (PDCP) data recovery at the UE for the unacknowledged data.

11. The apparatus of claim 7, wherein the instructions are further executable by the processor to cause the apparatus to:
identify that the one or more split radio bearers are configured as bearers capable of performing duplication.

12. The apparatus of claim 11, wherein the instructions are further executable by the processor to cause the apparatus to:
identify that, prior to the SCG failure, packet data convergence protocol (PDCP) duplication was active for the one or more split radio bearers.

13. A non-transitory computer-readable medium storing code for wireless communication at a user equipment (UE), the code comprising instructions executable by a processor to:
identify that the UE is configured with one or more split radio bearers under dual connectivity (DC) operation with a master cell group (MCG) and a secondary cell group (SCG);
identify, at the UE, an SCG failure in communications with the SCG;
determine a processing scheme for unacknowledged data for the SCG based at least in part on the SCG failure and without waiting for network reconfiguration of the one or more split radio bearers, wherein the determined processing scheme comprises attempting radio link control (RLC) reestablishment with an RLC for the SCG; and
attempt RLC reestablishment with an RLC for the SCG based at least in part on the determined processing scheme.

14. The non-transitory computer-readable medium of claim 13, wherein the instructions are further executable to:
identify that the one or more split radio bearers are data radio bearers (DRBs) configured for RLC acknowledgement mode (AM).

15. The non-transitory computer-readable medium of claim 13, wherein the instructions to identify the SCG failure are executable to:
identify a radio link failure (RLF) in the communications with the SCG.

16. The non-transitory computer-readable medium of claim 13, wherein the determined processing scheme further comprises instructions executable to:
perform packet data convergence protocol (PDCP) data recovery at the UE for the unacknowledged data.

17. The non-transitory computer-readable medium of claim 13, wherein the instructions are further executable to:
identify that the one or more split radio bearers are configured as bearers capable of performing duplication.

18. The non-transitory computer-readable medium of claim 17, wherein the instructions are further executable to:
identify that, prior to the SCG failure, packet data convergence protocol (PDCP) duplication was active for the one or more split radio bearers.

* * * * *